(12) United States Patent
Park et al.

(10) Patent No.: US 12,305,251 B2
(45) Date of Patent: May 20, 2025

(54) HEAT TREATMENT METHOD FOR TUBULAR SHAFT FOR DRIVE SHAFT HAVING BALL SPLINE STRUCTURE AND TUBULAR SHAFT MANUFACTURED THEREBY

(71) Applicant: ERAE AMS CO., LTD., Daegu (KR)

(72) Inventors: Se Jung Park, Daegu (KR); Dal Soo Jang, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 427 days.

(21) Appl. No.: 17/797,453

(22) PCT Filed: Dec. 31, 2020

(86) PCT No.: PCT/KR2020/019472
§ 371 (c)(1),
(2) Date: Aug. 4, 2022

(87) PCT Pub. No.: WO2021/157868
PCT Pub. Date: Aug. 12, 2021

(65) Prior Publication Data
US 2023/0093813 A1   Mar. 30, 2023

(30) Foreign Application Priority Data
Feb. 7, 2020 (KR) .................. 10-2020-0015023

(51) Int. Cl.
| | |
|---|---|
| *C21D 9/28* | (2006.01) |
| *C21D 1/06* | (2006.01) |
| *C21D 1/18* | (2006.01) |
| *C21D 8/10* | (2006.01) |
| *C23C 8/22* | (2006.01) |
| *C23C 8/80* | (2006.01) |

(52) U.S. Cl.
CPC ............... *C21D 9/28* (2013.01); *C21D 1/06* (2013.01); *C21D 1/18* (2013.01); *C21D 8/105* (2013.01); *C23C 8/22* (2013.01); *C23C 8/80* (2013.01); *C21D 2211/002* (2013.01); *C21D 2211/008* (2013.01)

(58) Field of Classification Search
CPC ... C21D 9/28; C21D 1/06; C21D 1/18; C21D 9/26; C21D 1/16; C23C 8/22; C23C 8/80
See application file for complete search history.

(56) References Cited

U.S. PATENT DOCUMENTS

| | | |
|---|---|---|
| 2003/0008717 A1 | 1/2003 | Welschof |
| 2011/0136580 A1 | 6/2011 | Ooba et al. |

FOREIGN PATENT DOCUMENTS

| | | |
|---|---|---|
| CN | 102597547 A | 7/2012 |
| CN | 103014726 A | 4/2013 |
| CN | 103821831 B | 8/2016 |

(Continued)

OTHER PUBLICATIONS

International Search Report of PCT/KR2020/019472 dated Mar. 16, 2021 [PCT/ISA/210].

(Continued)

*Primary Examiner* — Jessee R Roe
(74) *Attorney, Agent, or Firm* — Sughrue Mion, PLLC

(57) ABSTRACT in a heat treatment method for a tubular shaft for a drive shaft having a ball spline structure for a plunging and an undercut region with a reduced diameter, a carburizing-austempering is performed such that a deep portion hardness of the undercut region is a value between HRC 35 to HRC 50.

10 Claims, 5 Drawing Sheets

(56) References Cited

FOREIGN PATENT DOCUMENTS

| | | |
|---|---|---|
| CN | 107653433 B | 10/2019 |
| JP | 05-004128 A | 1/1993 |
| JP | 6241136 B2 | 12/2017 |
| JP | 6601358 B2 | 11/2019 |
| KR | 10-0737602 B1 | 7/2007 |
| KR | 10-2011-0052967 A | 5/2011 |
| KR | 10-2020-0002957 A | 1/2020 |

OTHER PUBLICATIONS

Communication dated Jan. 2, 2024, issued by the Chinese Patent Office in Chinese Patent Application No. 2020800958442.
European Search Report dated Apr. 25, 2024, issued by the European Patent Office in European Application No. 20918028.0.
Communication dated Sep. 5, 2023, issued by the Japanese Patent Office in Japanese Patent Application No. 2022-548070.
Communication dated Aug. 27, 2024, issued by the Chinese Patent Office in Chinese Patent Application No. 2020800958442.

【FIG. 1】
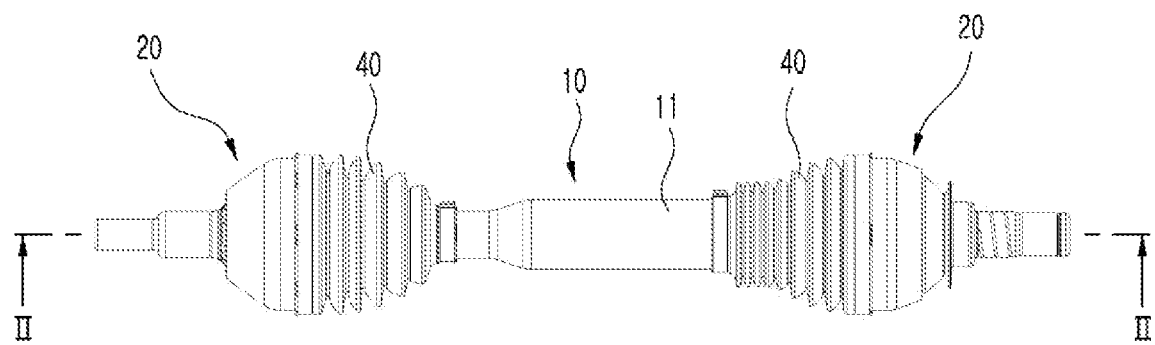
【FIG. 2】
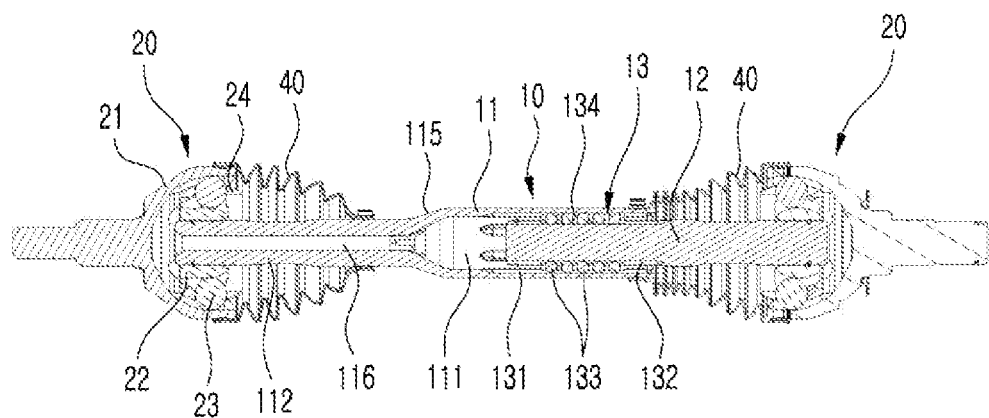

[FIG. 3]
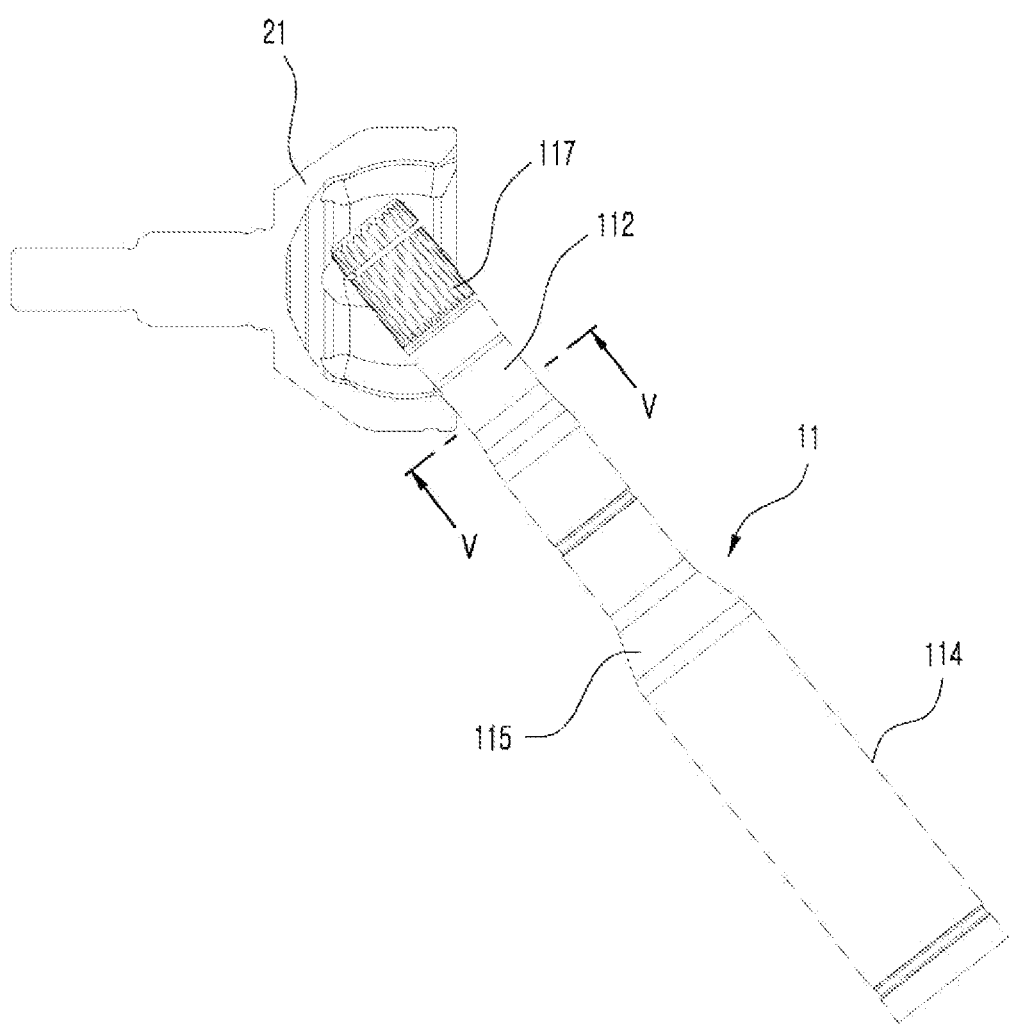

[FIG. 4]
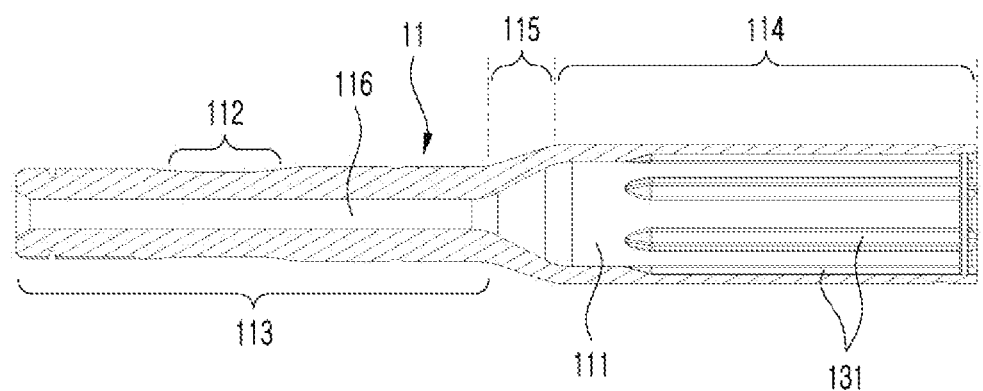
[FIG. 5]
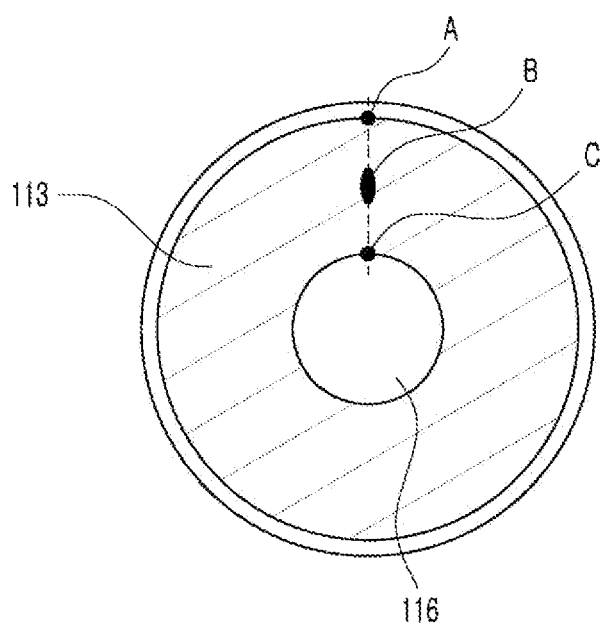

[FIG. 6]
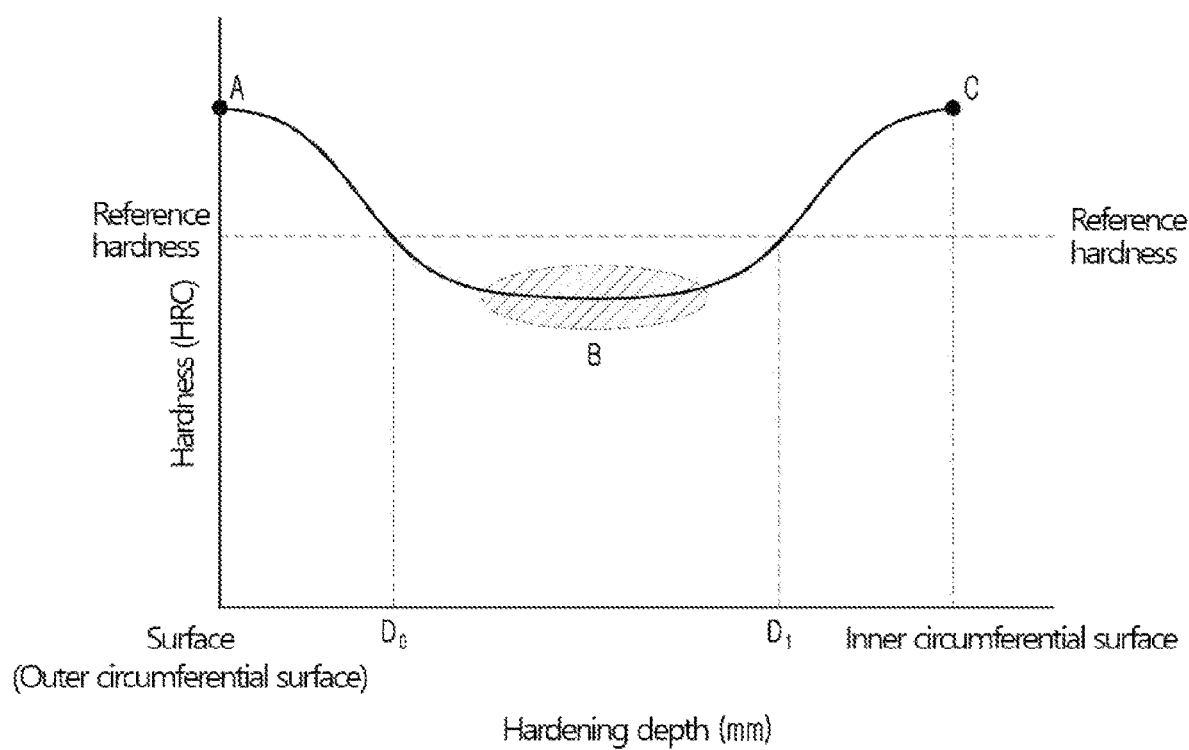

[FIG. 7]
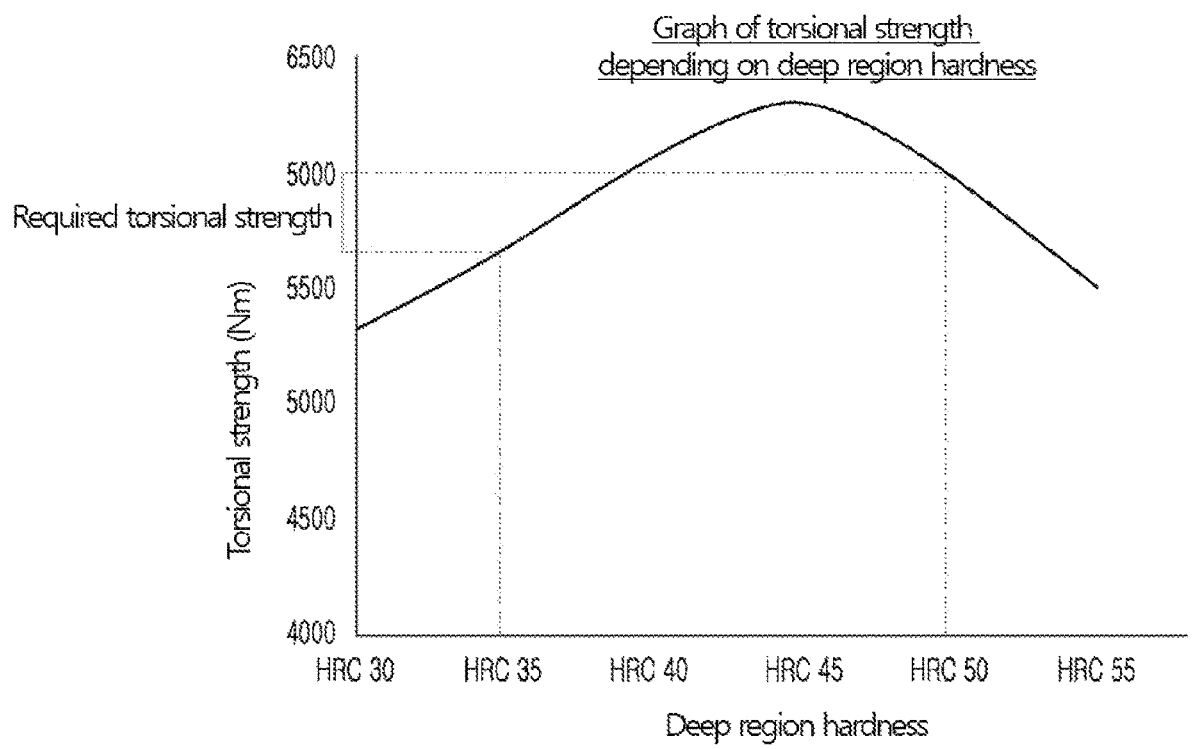

HEAT TREATMENT METHOD FOR TUBULAR SHAFT FOR DRIVE SHAFT HAVING BALL SPLINE STRUCTURE AND TUBULAR SHAFT MANUFACTURED THEREBY

CROSS REFERENCE TO RELATED APPLICATIONS

This application is a National Stage of International Application No. PCT/KR2020/019472, filed Dec. 31, 2020, claiming priority to Korean Patent Application No. 10-2020-0015023, filed Feb. 7, 2020.

TECHNICAL FIELD

The present invention relates to a heat treatment method for a tubular shaft of a drive shaft having a ball spline structure.

BACKGROUND ART

The drive shaft used in the vehicle's power transmission system is a device that transmits rotational power through constant velocity joints coupled to both ends thereof. A drive shaft configured to allow a change in axial length by applying a ball spline structure is being used. The ball spline structure is implemented on a tubular shaft and a solid shaft inserted therein and includes a plurality of outer grooves formed on an inner circumferential surface of the tubular shaft, a plurality of inner grooves formed on an outer circumferential surface of the solid shaft to be paired with the plurality of outer grooves respectively and a plurality of balls respectively disposed in a space formed by the pair of the outer grooves and the inner grooves. The relative rotation in the circumferential direction of the tubular shaft and the solid shaft is restricted by the balls disposed in the space formed by the outer groove and the inner groove, so that rotational power can be transmitted and at the same time a relative movement of the tubular shaft and the solid shaft in a longitudinal direction, i.e., a plunging is possible by the rolling motion of the balls.

In order to improve the performance of the drive shaft having the plunging function by the ball spline structure, a long plunging distance and a high articulation angle performance of the joint are required. In order to achieve a great articulation angle a method of forming an undercut region of reduced diameter near the end of the tubular shaft to which the constant velocity joint is engaged is used. When the tubular shaft rotates relative to an outer race of the constant velocity joint for an articulation, the area near the end to which the constant velocity joint is engaged may contact the open end of the outer race and the maximum articulation angle can be increased by reducing the diameter of the tubular shaft near the end which the outer race may contact.

Such an undercut region, which is formed to increase the maximum articulation angle, has a side effect of lowering the torsional strength of the drive shaft. Therefore, special strength reinforcement for the undercut area is required to secure the required torsional strength while securing the required large articulation angle.

Prior Patent Document: Japanese Patent Publication No. 05-004128 (Publication date: Jan. 14, 1993)

DETAILED DESCRIPTION OF THE INVENTION

Technical Object

An object of the present invention is to provide a heat treatment method for a tubular shaft capable of securing a required torsional strength through a strength reinforcement of an undercut region.

Technical Solution

In an embodiment of the present invention, in a heat treatment method for a tubular shaft for a drive shaft having a ball spline structure for a plunging and an undercut region with a reduced diameter, a carburizing-austempering is performed such that a deep portion hardness of the undercut region is a value between HRC 35 to HRC 50.

The deep portion hardness may be a value between HRC 38 to HRC 48.

The carburizing-austempering may be formed such that the undercut region comprises both bainite structure and martensite structure.

An effective hardening depth for the undercut region may be a value between 0.6 mm to 2.0 mm from a surface.

A surface hardness of the undercut region may be a value between HRC 58 to HRC 62.

A tubular shaft for a drive shaft according to an embodiment of the present invention is formed by the above-described heat treatment method.

Effect of the Invention

According to the present invention, it is possible to secure the required torsional strength through the management of the hardness of the deep region of the tubular shaft.

BRIEF DESCRIPTION OF THE DRAWINGS

FIG. 1 shows a drive shaft manufactured by a heat treatment method according to an embodiment of the present invention.

FIG. 2 is a sectional view taken by a line II-II in FIG. 1.

FIG. 3 shows a relative position of an outer race of a constant velocity joint and a tubular shaft of a drive shaft in an articulated state of the constant velocity joint.

FIG. 4 is a sectional view of a tubular shaft manufactured by a heat treatment method according to an embodiment of the present invention.

FIG. 5 is a sectional view taken by a line V-V in FIG. 1.

FIG. 6 shows a graph showing a hardness profile in a cross section of a tubular shaft obtained by a heat treatment method according to an embodiment of the present invention.

FIG. 7 shows a graph showing a torsional strength according to the size of the deep portion hardness of an undercut region of the tubular shaft obtained by the heat treatment method according to an embodiment of the present invention.

BEST MODE OF THE INVENTION

Embodiments of the present invention will be described hereinafter with reference to the accompanying drawings.

FIG. 1 shows a drive shaft 10 and a pair of constant velocity joints 20 respectively fastened to both ends thereof. A boot 40 for preventing foreign substances from entering and sealing grease may be coupled to the constant velocity joint 20 and the drive shaft 10.

As shown in FIG. 2, the drive shaft 10 may include a tubular shaft 11 and a solid shaft 12. The tubular shaft 11 may have a tubular shape having a receiving space 111 open at one side, and one end of the solid shaft 12 is movably inserted into the receiving space 111 for a plunging function.

The constant velocity joint 20 may be a Rzeppa joint that is a fixed type joint, and as shown in FIG. 2, may include an outer race 21, an inner race 22, torque transmission balls 23 and a ball cage 24. The tubular shaft 11 and the solid shaft 12 may be respectively spline-coupled to the inner race 22 to rotate with the inner race 22 of the constant velocity joint 20. A spline structure 117 for spline-coupling with the inner race 22 of the constant velocity joint 20 may be formed at an end portion of the tubular shaft 11.

A ball spline structure 13 is provided for enabling an axial relative motion of the tubular shaft 11 and the solid shaft 12, i.e., a plunging motion. The ball spline structure 13 has a plurality of outer grooves 131 formed in parallel with a longitudinal direction on the inner circumferential surface of the tubular shaft 11, and a plurality of inner grooves 132 on the outer circumferential surface of the solid shaft 12 in parallel with a longitudinal direction to form a pair with the respective of the plurality of outer grooves 131, a plurality of balls 133 respectively disposed in a plurality of spaces formed by the outer groove 131 and the inner groove 132, and a ball cage 134 that accommodates the plurality of balls 133. The ball 133 rolls in a space formed by the outer groove 131 and the inner groove 132 so that the tubular shaft 11 and the solid shaft 12 can undergo a movement toward or away from each other in the axial direction, that is, a plunging motion.

When the constant velocity joint 20 is maximally articulated as shown in FIG. 3, that is, when the drive shaft 10 coupled with the inner race 22 is in a state that is maximally bent with respect to the outer race 21, the tubular shaft 11 is provided with an undercut region 112 that is formed by being indented radially inward on the outer circumferential surface of the tubular shaft 11 in order to prevent the outer circumferential surface of the tubular shaft 11 from contacting an end portion 211 of the outer race 21. The maximum articulation angle of the constant velocity joint 20 may be increased by the formation of the undercut region 112.

Referring to FIG. 4, the tubular shaft 11 may include a stem portion 113 and a groove forming portion 114 where the outer grooves 131 of the ball spline structure 30 are formed. The groove forming part 114 may be formed to have a larger diameter than the stem part 113, and an inclined connection portion 115 connecting the stem portion 113 and the groove forming portion 114 may be provided. The stem portion 113 may include a through hole 116 communicating with an accommodation space 111 provided in the groove forming portion 114.

According to an embodiment of the present invention, a surface hardness, an effective hardening depth, and a deep portion hardness of the undercut region 112 of the tubular shaft 11 are optimally managed, and further, the bainite structure for increasing the toughness of the product is created and managed. For example, the tubular shaft 11 may be formed of an alloy containing 0.15 to 0.25% by weight of carbon, and the properties of the undercut region 112 may be obtained by carburizing-austempering treatment.

FIG. 6 is a graph showing a hardness profile according to a depth (radial position) in a cross-section of the undercut region of a tubular shaft manufactured according to an embodiment of the present invention. In FIG. 5 and FIG. 6, "A" denotes an outer surface, "C" denotes an inner surface, and "B" denotes a deep region in which carburization was not performed during the carburizing process. For example, the hardness of "A" and "C" may be HRC 58 to 62, and the hardness of the "B" region, that is, the deep portion hardness, may be HRC 35 to 50. The deep portion hardness refers to the hardness of the region of the deep portion of the product that is hardened by the austempering process without being carburized by the carburizing process during the carburizing-austempering processes comprising the carburizing process and the austempering process. The hardness value of the deep portion varies depending on austempering conditions such as temperature, duration time and stirring, and the present invention limits the range of the deep portion hardness values based on the recognition that the stiffness varies depending on the deep portion hardness range.

Meanwhile, the reference hardness may be a specific hardness used as a reference of the hardening depth in the carburized hardening layer, that is, the hardness at an effective hardening depth, and for example may be HRC 55. The effective hardening depth may be positions Do and Di corresponding to 10 to 15% of the thickness of the undercut area from the outer surface and the inner surface, and alternatively may be a position corresponding to 0.6 mm to 2.0 mm from the surface.

Table 1 below shows the results of evaluation of breaking strength according to deep portion hardness in three samples SPL 1, SPL 2 and SPL 3. Three samples were obtained by manufacturing a tubular shaft from chromium-molybdenum steel in the same way.

TABLE 1

| | Torsional breaking strength Deep portion hardness | | | | | |
|---|---|---|---|---|---|---|
| Sample | HRC 30 | HRC 35 | HRC 40 | HRC 45 | HRC 50 | HRC 55 |
| SPL 1 | 5,375 Nm | 5,674 Nm | 6,096 Nm | 6,250 Nm | 5,996 Nm | 5,508 Nm |
| SPL 2 | 5,269 Nm | 5,617 Nm | 6,038 Nm | 6,329 Nm | 5,876 Nm | 5,694 Nm |
| SPL 3 | 5,337 Nm | 5,742 Nm | 6,057 Nm | 6,322 Nm | 6,081 Nm | 5,326 Nm |

Further, FIG. 7 is a graph showing the torsional strength depending on the deep portion hardness and shows the results of Table 1 as a graph. Referring to FIG. 7, when the deep portion hardness increases from HRC 30 to HRC 45, the torsional strength gradually increases, and when the deep portion hardness exceeds HRC 45, the torsional strength gradually decreases. From the results in FIG. 7, it was found that the required torsional strength was satisfied when the deep portion hardness was HRC 35 to HRC 50. Meanwhile, the deep portion hardness may also be regulated as HRC 38 to HRC 48. Table 2 below shows the evaluation results of torsional breaking strength depending on the presence or absence of bainite. Three samples were obtained by manufacturing tubular shafts from chromium-molybdenum steel in the same way, with carburizing heat treatment, i.e., without bainite, and with carburizing-austempering heat treatment, i.e., with bainite. The torsional breaking strength was measured, respectively.

TABLE 2

| Sample | Torsional breaking strength | |
|---|---|---|
| | Without Bainite | With Bainite |
| SPL1 | 5,576 Nm | 6,158 Nm |
| SPL2 | 5,505 Nm | 5,947 Nm |
| SPL3 | 4,775 Nm | 5,997 Nm |

It can be noted that in all three samples in Table 2 (SPL1, SPL2, SPL3) greater torsional breaking strength was obtained with the presence of bainite. This means that the formation of bainite as well as martensite as a result of carburizing-austempering heat treatment increases torsional strength.

Although preferred embodiments of the present invention have been described in detail above, the scope of the present invention is not limited thereto, and various modifications and improvements by those skilled in the art using the basic concept of the present invention as defined in the following claims are also within the scope of the invention.

INDUSTRIAL APPLICABILITY

Since the present invention relates to a method for heat treatment of a tubular shaft for a drive shaft of a vehicle, the present invention has an industrial applicability.

The invention claimed is:

1. A heat treatment method for a tubular shaft for a drive shaft having a ball spline structure for a plunging and an undercut region with a reduced diameter, wherein a carburizing-austempering is performed such that a deep portion hardness of the undercut region is a value between HRC 35 to HRC 50.

2. The heat treatment method of claim 1, wherein the deep portion hardness is a value between HRC 38 to HRC 48.

3. The heat treatment method of claim 1, wherein the carburizing-austempering is formed such that the undercut region comprises both bainite structure and martensite structure.

4. The heat treatment method of claim 1, wherein an effective hardening depth for the undercut region is a value between 0.6 mm to 2.0 mm from a surface.

5. The heat treatment method of claim 1, wherein a surface hardness of the undercut region is a value between HRC 58 to HRC 62.

6. A tubular shaft for a drive shaft formed by a heat treatment method of claim 1.

7. A tubular shaft for a drive shaft formed by a heat treatment method of claim 2.

8. A tubular shaft for a drive shaft formed by a heat treatment method of claim 3.

9. A tubular shaft for a drive shaft formed by a heat treatment method of claim 4.

10. A tubular shaft for a drive shaft formed by a heat treatment method of claim 5.

* * * * *